United States Patent [19]

Almes et al.

[11] Patent Number: 4,955,466
[45] Date of Patent: Sep. 11, 1990

[54] BELT CONVEYOR WITH BELT REINFORCING MEMBER

[75] Inventors: Horst-Dieter Almes, Hildesheim; Bernd Grutza, Sarstedt, both of Fed. Rep. of Germany

[73] Assignee: Transnorm System GmbH, Harsum, Fed. Rep. of Germany

[21] Appl. No.: 376,296

[22] Filed: Jul. 6, 1989

[30] Foreign Application Priority Data

Jul. 6, 1988 [DE] Fed. Rep. of Germany ....... 3822824

[51] Int. Cl.$^5$ .............................................. B65G 15/02
[52] U.S. Cl. .................................... 198/831; 198/842; 198/840
[58] Field of Search ............... 198/831, 839, 778, 840, 198/842

[56] References Cited

U.S. PATENT DOCUMENTS 3,237,754  3/1966  Freitag, Jr. et al. ................. 198/831
4,227,610 10/1980  Gerdes et al. ........................ 198/831

FOREIGN PATENT DOCUMENTS 2055682  5/1972  Fed. Rep. of Germany ...... 198/831

*Primary Examiner*—Joseph J. Rolla
*Assistant Examiner*—D. Glenn Dayoan
*Attorney, Agent, or Firm*—Peter K. Kontler

[57] ABSTRACT

The radially outermost marginal portion of a flat washer-like or disc-shaped belt in a belt conveyor is confined in an arcuate slot of a reinforcing member which has (a) a bead surrounding the peripheral surface of the marginal portion, and (b) two lips each of which extends radially inwardly of the bead and overlies one of the two lateral surfaces of the marginal portion. The lips are fastened to the belt, and the bead has a convex external surface which is guided by pairs of rolling elements at locations radially outwardly of fasteners which secure the lips to the belt. This reduces the likelihood of spreading of the open inner end of the slot and resulting rapid destruction of the reinforcing member.

20 Claims, 3 Drawing Sheets

BELT CONVEYOR WITH BELT REINFORCING MEMBER

BACKGROUND OF THE INVENTION

The invention relates to conveyors in general, and more particularly to improvements in belt conveyors. Still more particularly, the invention relates to improvements in belt conveyors of the type wherein the convexly curved radially outermost portion of a flat belt is reinforced by a bead and is guided by rolling elements.

German Pat. No. 2 055 682 discloses a conveyor wherein the reinforcing member for the outer marginal portion of the belt is a bead which has a slot for the marginal portion of the belt and is caused to advance between pairs of conical rolling elements. The axes of the rolling elements are inclined with reference to the plane of the belt, and the rolling elements of each pair engage opposite sides of the slotted bead for the marginal portion of the belt. Such inclination of the rolling elements is intended to ensure that the bead is subjected to pronounced deforming stresses, namely to the action of forces which tend to narrow the slot and to urge the internal surfaces of the bead against the respective lateral surfaces of the confined marginal portion of the belt. This should establish a self-locking action between the bead and the belt but should not affect the fasteners which are used to secure the bead to the belt. Moreover, the rolling elements are supposed to cause the bead to center the belt and to otherwise act upon the belt in such a way that the magnitude of forces acting upon one lateral surface of the belt matches the magnitude of forces which act upon the other lateral surface of the belt.

The threads or like fasteners which are used to connect the belt to the bead are located between the radially outermost portion of the belt and those portions of the bead which are engaged by the rolling elements. Therefore, if the belt is subjected to pronounced tensional stresses which act radially inwardly, such stresses tend to extract the marginal portion from the slot of the bead. This, in turn, causes the bead to widen the open side or end of its slot with attendant pronounced deformation which leads to rapid destruction of the reinforcing member. The forces which develop in response to the application of radially inwardly oriented tensional stresses to the belt (e.g., as a result of overloading) cannot be readily defined and, therefore, it was considered to be difficult to plain impossible to undertake effective remedial steps.

OBJECTS OF THE INVENTION

An object of the invention is to provide a novel and improved belt conveyor of the type wherein the convexly curved radially outermost marginal portion of a flat belt is confined in a reinforcing member.

Another object of the invention is to provide a novel and improved reinforcing member for use in the above outlined belt conveyor.

A further object of the invention is to provide a belt conveyor wherein the slot for the marginal portion of the belt is not likely to expand in response to the application of radially inwardly oriented tensional stresses to the belt.

An additional object of the invention is to provide the reinforcing member with novel and improved means for preventing deformation of that portion or those portions of the reinforcing member which are adjacent the open end of the slot for the marginal portion of the belt.

A further object of the invention is to provide a belt conveyor wherein the useful life of the reinforcing member for the belt is longer than the useful life of the reinforcing member in a conventional belt conveyor.

Still another object of the invention is to provide a novel and improved combination of reinforcing member and belt for use in the above outlined conveyor.

A further object of the invention is to provide a novel and improved combination of reinforcing member and guide means for use in the above outlined belt conveyor.

Another object of the invention is to provide a novel and improved method of prolonging the useful life of component parts of the above outlined belt conveyor.

An additional object of the invention is to provide a belt conveyor which can be used as a simpler, longer-lasting and more reliable substitute for heretofore known conveyors.

SUMMARY OF THE INVENTION

The invention is embodied in a belt conveyor which comprises an elongated belt having a convexly curved outer marginal portion (the belt can resemble a large flat disc or washer) having two lateral surfaces and a peripheral surface or edge face between the two lateral surfaces. Each lateral surface has a first portion which is adjacent and a second portion which is remote from the peripheral surface, and the conveyor further comprises a reinforcing member for the marginal portion of the belt. The reinforcing member includes a bead which surrounds the peripheral surface and the first portions of lateral surfaces of the marginal portion, and the reinforcing member further comprises two lips each of which overlies the second portion of one of the lateral surfaces, i.e., each lateral surface is overlapped by a discrete lip.

The belt conveyor further comprises means for fastening the lips to the belt; such fastening means can include stitches, rivets, clamps or the like.

The belt conveyor also comprises guide means for the reinforcing member. Such guide means includes rolling elements (e.g., in the form of cylindrical rollers, barrel-shaped rollers or frustoconical rollers) which engage the bead and include a first rolling element adjacent one of the lips and a second rolling element adjacent the other lip. The first and second rolling elements are rotatable about axes which make acute angles with and slope toward the respective lips in a direction away from the peripheral surface or marginal portion of the belt. The external surface of the bead is preferably convex, at least in part and at least in the regions of engagement with the rolling elements of the guide means.

The cross-sectional outline of the bead need not be a circular outline; in fact, it is presently preferred to provide the reinforcing member with a bead which has a substantially oval cross-sectional outline.

The bead preferably includes at least one portion having a first thickness and a second portion having a second thickness less than the first thickness. The rolling elements of the aforementioned guide means preferably engage the portion or portions of first thickness. The preferably convex external surface of the bead includes at least one first section which surrounds the at least one first portion of the bead, and a second section which surrounds the second portion of the bead. The radius of curvature of the at least one first portion of the external surface is greater than the radius of curvature of the second portion of the bead. The bead portion of minimum thickness is preferably adjacent the peripheral surface of the marginal portion of the belt.

The slot of the reinforcing member can be provided with an enlarged portion in the region of the peripheral surface of marginal portion of the belt.

The two lips are or can be mirror images of each other with reference to the plane of the slot. In fact, the entire reinforcing member can consist of two mirror symmetrical halves.

As mentioned above, the belt is or can be flat, and its thickness can equal or exceed the thickness of at least one of the lips. Furthermore, the bead is or can be at least slightly flexible in the region of the peripheral surface of marginal portion of the belt.

The slot can have a substantially constant width between the lips. The open side of the slot is disposed between the lips and is remote from the bead, and the closed side of the slot is disposed within the bead. The bead can be provided with a substantially concave internal surface which bounds the closed end of the slot and is spaced apart from the peripheral surface and/or from the lateral surfaces of marginal portion of the belt.

It is also within the purview of the invention to provide the reinforcing member with a single lip or with a narrower and a wider lip. The lip or lips are or can be integral with the bead, and the aforementioned fastening means is preferably designed to secure the belt only to the lip or lips of the reinforcing member.

The novel features which are considered as characteristic of the invention are set forth in particular in the appended claims. The improved belt conveyor itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
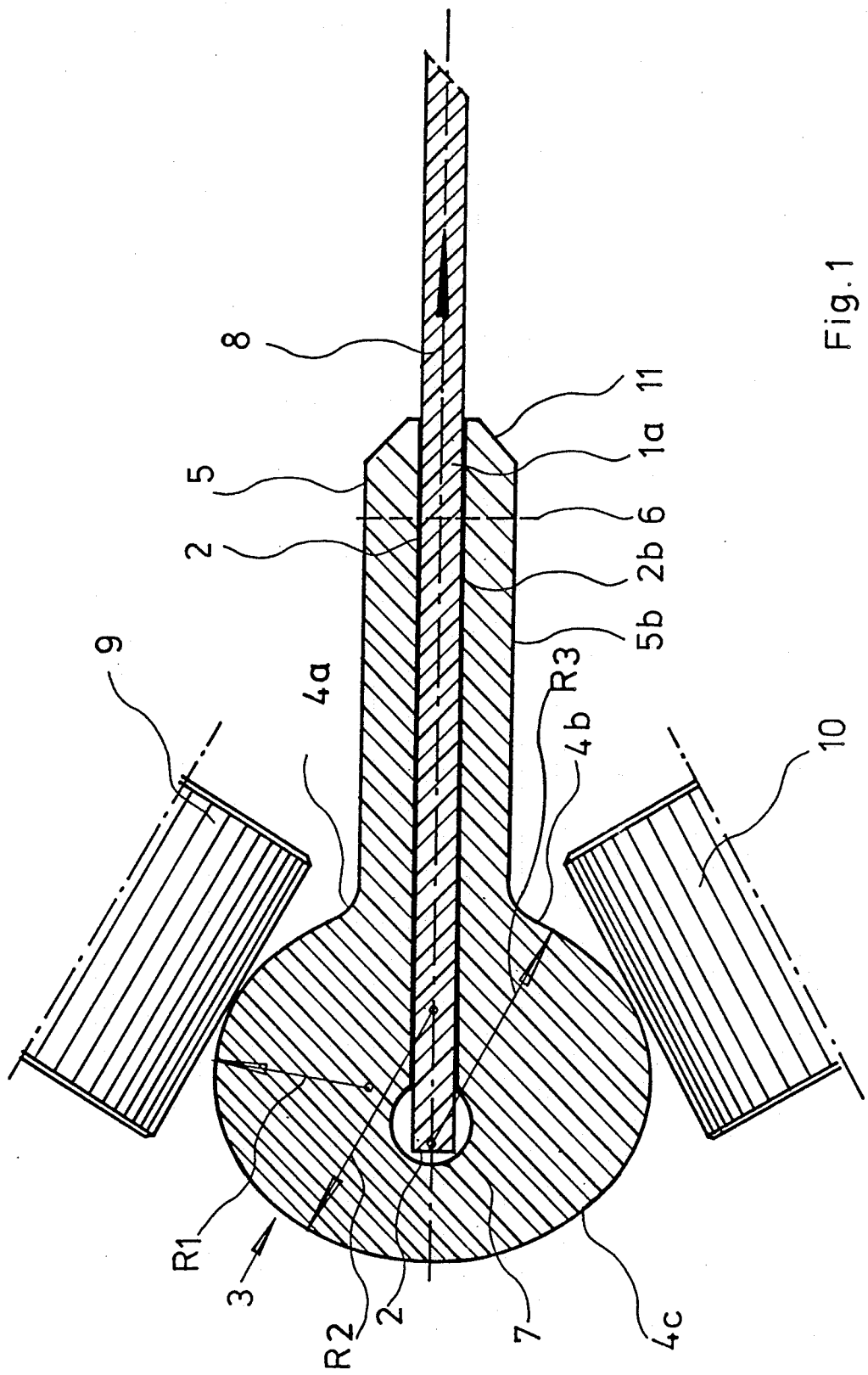
FIG. 1 is a transverse sectional view of the belt and reinforcing member in a belt conveyor which embodies one form of the invention, the convex external surface of the bead of the reinforcing member being engaged by two mirror symmetrical rolling elements of a guide means for the bead.
Figure 2:
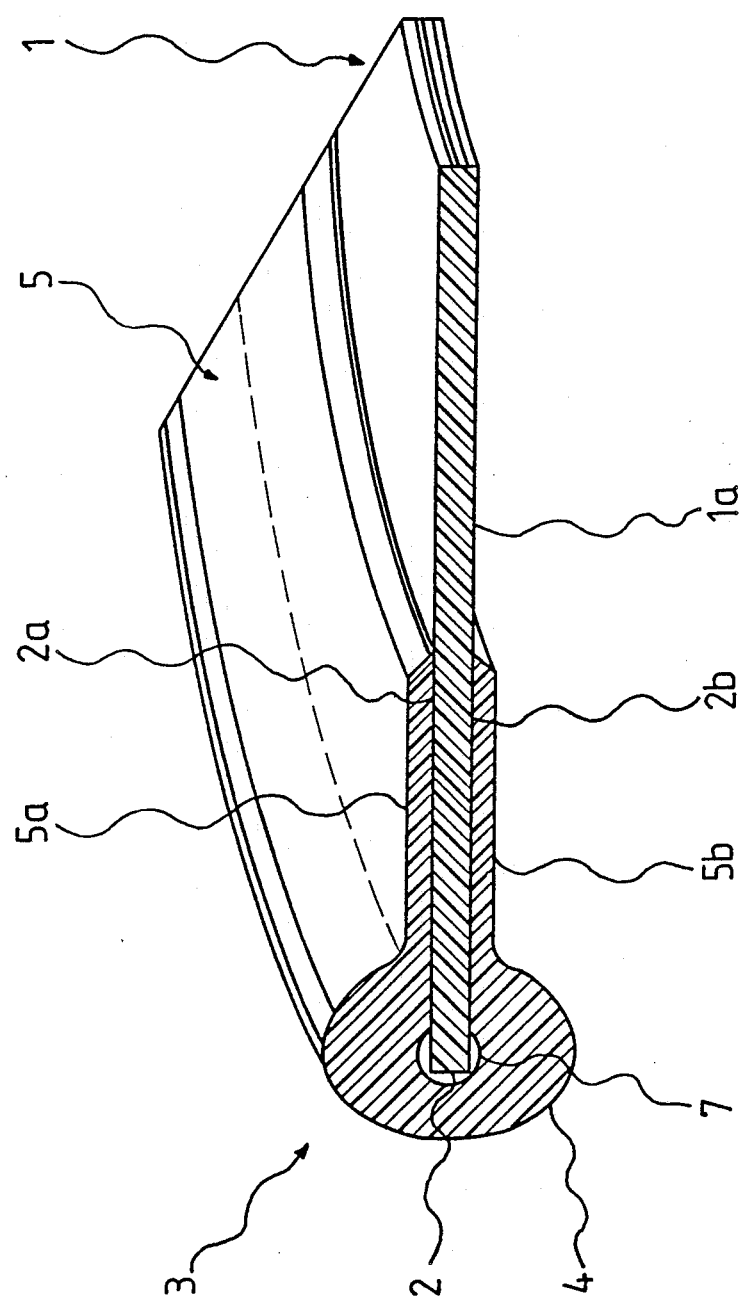
FIG. 2 is a fragmentary perspective view of a portion of the belt and of the corresponding portion of the reinforcing member.
Figure 3:
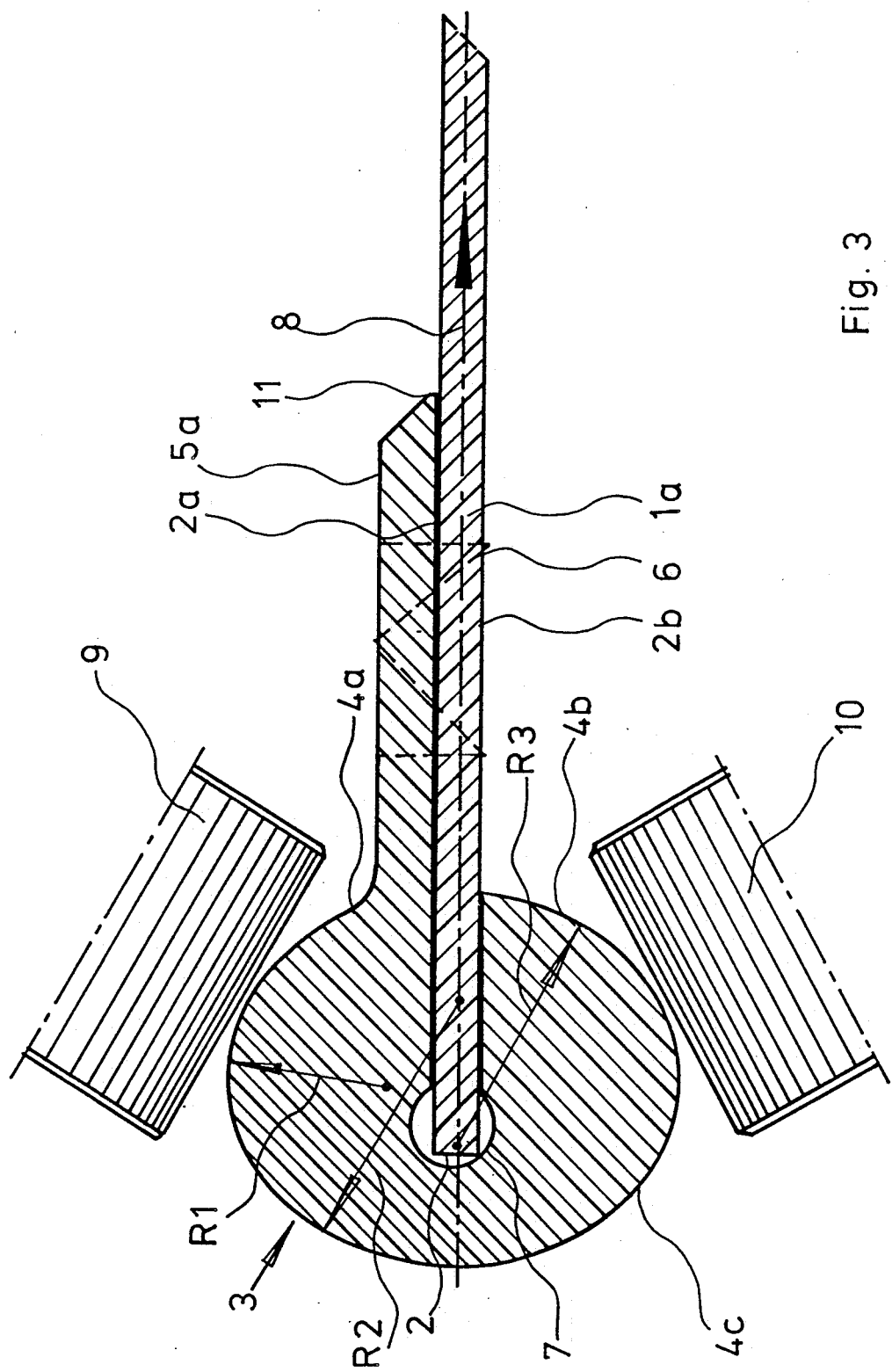
FIG. 3 is a transverse sectional view of the belt and reinforcing member in a belt conveyor which embodies another form of the invention.

The drawing shows a portion of a belt conveyor which includes a flat belt 1 having a convexly curved marginal portion 1a having a peripheral surface 2, a first lateral surface 2a and a second lateral surface 2b. The peripheral surface 2 is disposed between the two lateral surfaces 2a, 2b and is confined in the radially innermost portion (closed end) of an arcuate slot 20 defined by a specially designed arcuate reinforcing member 3. The latter comprises a relatively thick outer part 4 (hereinafter called bead) which surrounds the peripheral surface 2 and the adjacent radially outermost (first) portions of the lateral surfaces 2a, 2b. The reinforcing member 3 further comprises a relatively thin second portion 5 composed of two flat strip-shaped lips 5a, 5b which are respectively adjacent the radially inner (second) portions of the lateral surfaces 2a, 2b of marginal portion 1a of the belt 1. The bead 4 and the lips 5a, 5b extend all the way along the marginal portion 1a of the belt 1. The means (e.g., in the form of threads, rivets, clamps or the like) for fastening only the lips 5a, 5b of the reinforcing member 3 to the marginal portion 1a of the belt 1 is indicated schematically by a phantom line 6. Such fastening means is disposed radially inwardly of the bead 4. The latter has a concave internal surface 7 which spacedly surrounds the peripheral surface and/or the adjacent radially outermost portions of the lateral surfaces 2a and 2b. This enhances the versatility of the reinforcing member 3 because this member can be used in conjunction with relatively thick belts or with thinner belts. The thickness of the marginal portion 1a of the belt 1 can equal or exceed the thickness of the lip 5a and/or 5b. These lips are mirror symmetrical to each other with reference to the central plane of the slot 20 and belt portion 1a. In fact, the entire reinforcing member 3 preferably consists of two mirror symmetrical halves, and each of these halves includes one-half of the bead 4 and one of the lips 5a, 5b.

The arrow 8 indicates in FIG. 1 the direction of a force which acts upon the marginal portion 1a of the belt 1 and tends to extract the belt from the slot 20. This causes two spaced-apart sections 4a, 4b of the convex external surface of the bead 4 to bear against the external surfaces of rolling elements 9 and 10 forming part of a means for guiding the reinforcing member 3 and the belt 1 when the conveyor is in use. It will be readily seen that the bead 4 is actually wedged between the rolling elements 9 and 10 when the belt 1 is acted upon by the radially inwardly oriented force acting in the direction of arrow 8. The illustrated rolling elements 9 and 10 are cylinders; however, it is equally possible to employ barrel-shaped or frustoconical rolling elements without departing from the spirit of the invention. The points of engagement between the rolling elements 9, 10 and the bead 4 are respectively adjacent the radially outermost portions of the lips 5a and 5b. The axes of the rolling elements 9, 10 make acute angles with the planes of the respective lips (5a, 5b), and such axes slope toward the belt 1 in directions away from the bead 4 and away from the peripheral surface 2 of the marginal portion 1a.

The external surface of the bead 4 has the aforementioned convex sections 4a, 4b which have relatively large radii ($R_1$) of curvature and are respectively engaged by the rolling elements 9, 10, and a median section 4c having a smaller radius of curvature. The illustrated section 4c has a relatively small radius of curvature $R_2$ adjacent each of the sections 4a, 4b and a somewhat larger radius of curvature $R_3$ outwardly adjacent the closed end of the slot 20. The thickness (and hence the strength) of those portions of the bead 4 which are adjacent the sections 4a, 4b is greater than the thickness of bead portion which is outwardly adjacent the peripheral surface 2. This enhances the flexibility of the bead 4 in the general plane of the slot 20.

It will be noted that the locations of engagement between the rolling elements 9, 10 on the one hand, and the respective sections (4a, 4b) of the convex external surface of the bead 4 on the other hand, are located radially outwardly of the fastening means 6. Therefore, the improved reinforcing member 3 is much less likely to widen the open end of its slot 20 (such open end is located between the preferably chamfered end faces 11 of the lips 5a, 5b). Consequently, the likelihood of premature destruction of the improved reinforcing member 3 is much less pronounced than that of a conventional reinforcing member which does not have any lips. Otherwise stated, by shifting the loci of engagement between the rolling elements 9, 10 and the external surface of the bead 4 radially outwardly of the fastening means 6, the lips 5a and 5b are not acted upon by any forces which would tend to expand the open end of the slot (and to thus promote rapid destruction of the reinforcing member 3) when the belt conveyor is in use and the belt 1 is acted upon by a force which tends to extract it from the slot 20 in the direction of arrow 8. In fact, this causes the bead 4 to become wedged between the peripheral surfaces of the rolling elements 9, 10 and to urge thereby the surfaces flanking the slot 20 into stronger engagement with the respective lateral surfaces 2a, 2b of the belt 1.

The cross-sectional outline of the bead 4 departs, or can depart, from a circular cross-sectional outline. The illustrated bead 4 has a substantially oval cross-sectional outline. As mentioned above, the two thickest portions of the bead (inwardly adjacent the sections 4a, 4b of the external surface of the bead) are adjacent the rolling elements 9 and 10. This results in a reduction of pressure per unit area of the external surface of the bead 4 in the regions of engagement with the peripheral surfaces of the rolling elements 9 and 10 and thus reduces the likelihood of the development of pronounced fulling forces which could affect the useful life of the bead. Each of the sections 4a, 4b can extend along an arc of approximately 35° (as seen in the circumferential direction of the bead 4). Those portions of the section 4c which have radii of curvature $R_2$ can extend along arcs which at least equal or exceed 35°, and the remaining portion of the section 4c has the radius of curvature $R_3$ which is or can be smaller than $R_1$. This ensures that the bead 4 can be more readily flexed in the plane of the belt 1 to thus enable the rolling elements 9, 10 to urge the surfaces bounding the slot 20 against the respective lateral surfaces 2a, 2b of the marginal portion 1a. Moreover, such flexibility of the bead 4 in the region which is outwardly adjacent the peripheral surface 2 renders it possible to use one and the same reinforcing member 3 with thicker or thinner belts.

An advantage of the improved belt conveyor and of its reinforcing member 3 is that the bead 4 cooperates with the rolling elements 9, 10 or with analogous rolling elements in such a way that the fastening means 6 is not subjected to pronounced stresses. This is due to the fact that the bead 4 (which is drawn between the rolling elements 9 and 10, tends to urge the lips 5a and 5b against the respective lateral surfaces 2a, 2b to thus relieve the fastening means 6.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. In a belt conveyor, an elongated belt comprising a convexly curbed outer marginal portion having two lateral surfaces and a peripheral surface between said lateral surfaces, each of said lateral surfaces having a first portion adjacent and a second portion remote from said peripheral surface; a reinforcing member having a slot receiving said marginal portion of said belt and said member including a bead surrounding said peripheral surface and overlying the first portions of said lateral surfaces, and two lips overlying the second portion of one of said lateral surfaces; and guide means for said reinforcing member, comprising rolling elements engaging said bead and including a first rolling element adjacent one of said lips and a second rolling element adjacent the other of said lips, each of said first and second elements being rotatable about an axis making an acute angle with and sloping toward the respective lip in a direction away from said peripheral surface.

2. The structure of claim 1, further comprising means for fastening said lips to said belt.

3. The structure of claim 1, wherein said bead has an external surface which is convex, at least in the regions of engagement with said rolling elements.

4. The structure of claim 1, wherein said bead has an at least partially convex external surface.

5. The structure of claim 1, wherein said bead has a non-circular cross-sectional outline.

6. The structure of claim 1, wherein said bead has a substantially oval cross-sectional outline.

7. The structure of claim 1, wherein said bead includes a portion of minimum thickness adjacent said peripheral surface.

8. The structure of claim 1, wherein said lips are mirror images of each other with reference to the plane of said slot.

9. The structure of claim 1, wherein said reinforcing member includes two mirror symmetrical halves.

10. The structure of claim 1, wherein said belt is flat and has a first thickness, each of said lips having a second thickness and the thickness of at least one of said lips being less than said first thickness.

11. The structure of claim 1, wherein said bead is at least slightly flexible in the region of said peripheral surface.

12. The structure of claim 1, further comprising threads securing at least one of said lips to said belt.

13. In a belt conveyor, an elongated belt comprising a convexly cured outer marginal portion having two lateral surfaces and a peripheral surface between said lateral surfaces, each of said lateral surfaces having a first portion adjacent and a second portion remote from said peripheral surface; a reinforcing member having a slot receiving said marginal portion of said belt, said member including a bead surrounding said peripheral surface and overlying the first portions of said lateral surfaces, and two lips each overlying the second portion of one of said lateral surfaces, said bead including at least one first portion having a first thickness and a second portion of lesser second thickness; and guide means including rolling elements engaging said at least one first portion of said bead.

14. The structure of claim 13, wherein said bead has a convex external surface including a first section surrounding said at least one first portion and having a first radius of curvature and a second section surrounding said second portion of said bead and having a smaller second radius of curvature.

15. In a belt conveyor, an elongated belt comprising a convexly curved outer marginal portion having two lateral surfaces and a peripheral surface between said portion adjacent and a second portion remote from said peripheral surface a reinforcing member having a slot receiving said marginal portion and said member including a bead surrounding said peripheral surface and overlying the first portions of said lateral surfaces, and at least one lip overlying the second portion of one of said lateral surfaces; and guide means for said reinforcing member, comprising rolling elements engaging said bead and including a first rolling element adjacent said at least one lip and a second rolling element adjacent the second portion of the other of said lateral surfaces, each of said first and second elements being rotatable about an axis making an acute angle with and sloping toward the second portion of the respective lateral surface in a direction away from said peripheral surface.

16. The structure of claim 15, wherein said belt is flat and said lip is integral with said bead.

17. The structure of claim 15, further comprising means for fastening only the lip of said reinforcing member to said belt.

18. In a belt conveyor, an elongated belt comprising a convexly curved outer marginal portion having two lateral surfaces and a peripheral surface between said lateral surfaces, each of said lateral surfaces having a first portion adjacent and a second portion remote from said peripheral surface; and a reinforcing member having a slot receiving said marginal portion and having an enlarged portion in the region of said peripheral surface, said reinforcing member including a bead surrounding said peripheral surface and overlying the first portions of said lateral surfaces, and two lips each overlying the second portion of one of said lateral surfaces.

19. In a belt conveyor, an elongated belt comprising a convexly curved outer marginal portion having two lateral surfaces and a peripheral surface between sai lateral surfaces, each of said lateral surfaces having a first portion adjacent and a second portion remote from said peripheral surface; and a reinforcing member having a slot receiving said marginal portion of said belt, said reinforcing member including a bead surrounding said peripheral surface and overlying the first portions of said lateral surfaces, and two lips each overlying the second portion of one of said lateral surfaces, said slot having an open side which is disposed between said lips and is remote from said bead and a closed side within said bead, said slot having a substantially constant width between said lips and said bead having a concave internal surface bounding the closed end of said slot and being spaced apart from said peripheral surface.

20. In a belt conveyor, an elongated belt comprising a convexly curved outer marginal portion having two lateral surfaces and a peripheral surface between said lateral surfaces, each of said lateral surfaces having a first portion adjacent and a second portion remote from said peripheral surface; and a reinforcing member having a slot receiving said marginal portion of said belt, said reinforcing member including a bead surrounding said peripheral surface and overlying the second portion of one of said lateral surfaces, said slot having an open side which is disposed between said lips and is remote from said bead and a closed side within said bead, said slot having a substantially constant width between said lips and said bead having a concave internal surface bounding the closed end of said slot and being spaced apart from said lateral surfaces.

* * * * *